United States Patent [19]

Shirao

[11] 4,133,199
[45] Jan. 9, 1979

[54] TRANSFER MECHANISM FOR FORGING MACHINES

[75] Inventor: Shojiro Shirao, Komatsu, Japan

[73] Assignee: Kabushiki Kaisha Komatsu Seisakusho, Tokyo, Japan

[21] Appl. No.: 776,898

[22] Filed: Mar. 11, 1977

[51] Int. Cl.² .................................................. B21D 43/05
[52] U.S. Cl. ........................................... 72/405; 72/421
[58] Field of Search ........................... 72/405, 421, 455

[56] References Cited

U.S. PATENT DOCUMENTS

| 3,011,464 | 12/1961 | Danly | 72/405 |
| 3,079,817 | 3/1963 | Sanford | 72/405 |
| 3,422,657 | 1/1969 | Grombka | 72/405 |
| 3,760,957 | 9/1973 | Berger | 72/405 |
| 3,805,582 | 4/1974 | Logan | 72/405 |

FOREIGN PATENT DOCUMENTS

| 2359912 | 1/1973 | Fed. Rep. of Germany | 72/405 |
| 2018573 | 5/1970 | France | 72/421 |

Primary Examiner—C.W. Lanham
Assistant Examiner—Gene P. Crosby
Attorney, Agent, or Firm—Armstrong, Nikaido, Marmelstein & Kubovcik

[57] ABSTRACT

A transfer mechanism for use in forging machines including a bolster comprising a pair of substantially parallel transfer bars, each supporting gripper means adapted to grip blanks to be transferred, said transfer bars being supported for operation through a cycle including movements in three dimensions, each dimension of movement being substantially perpendicular to the other two directions of movements. Three separate drives are interconnected so as to move the transfer bars and all can be actuated by a single power source and are arranged to operate without adversely affecting the operation of the other drives. The transfer mechanism, further includes a pair of U-shaped casings mounted at both ends of said transfer bars so as to provide enough space to accommodate said transfer bars as well as loading and unloading devices therein.

4 Claims, 16 Drawing Figures

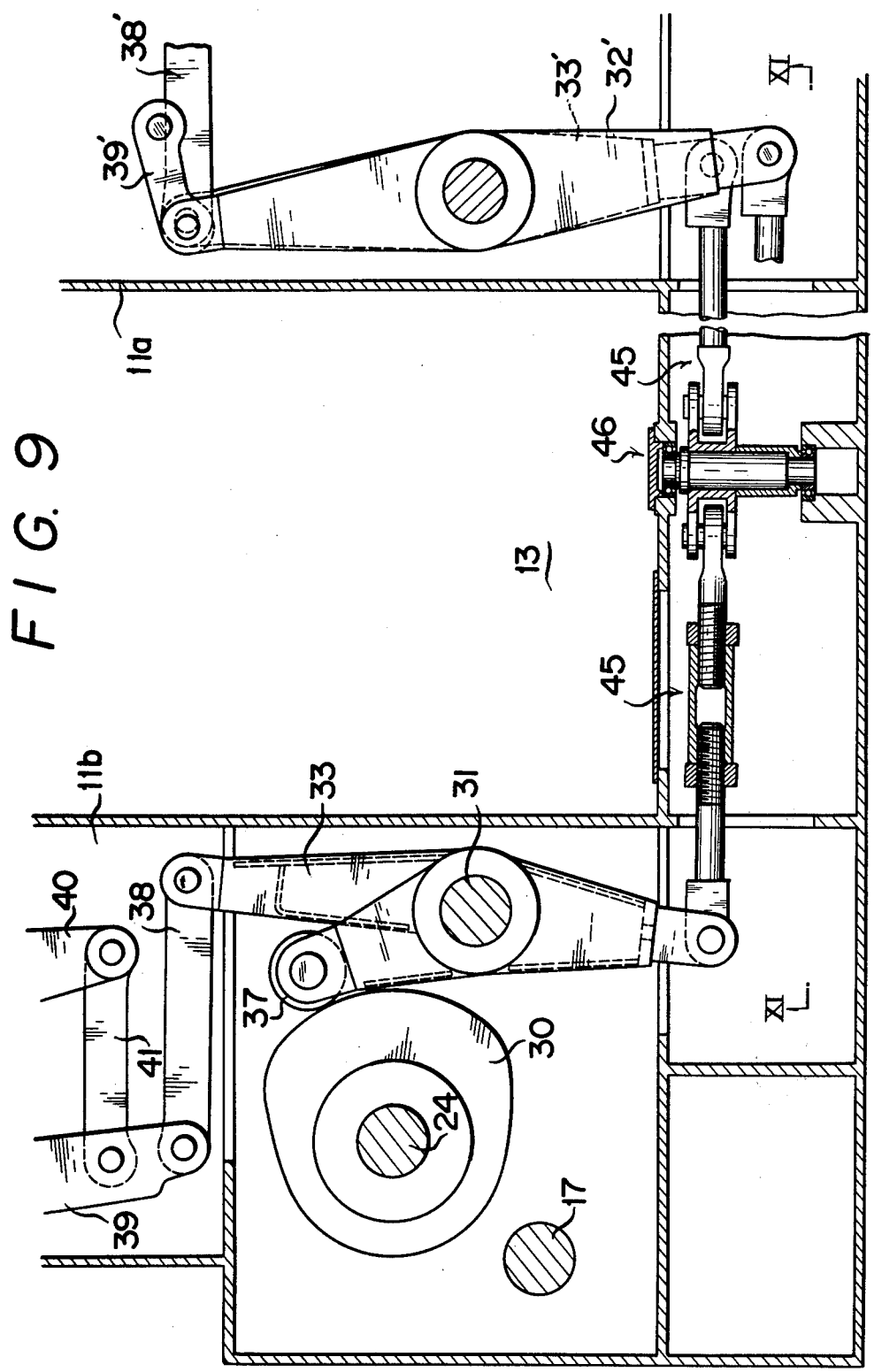

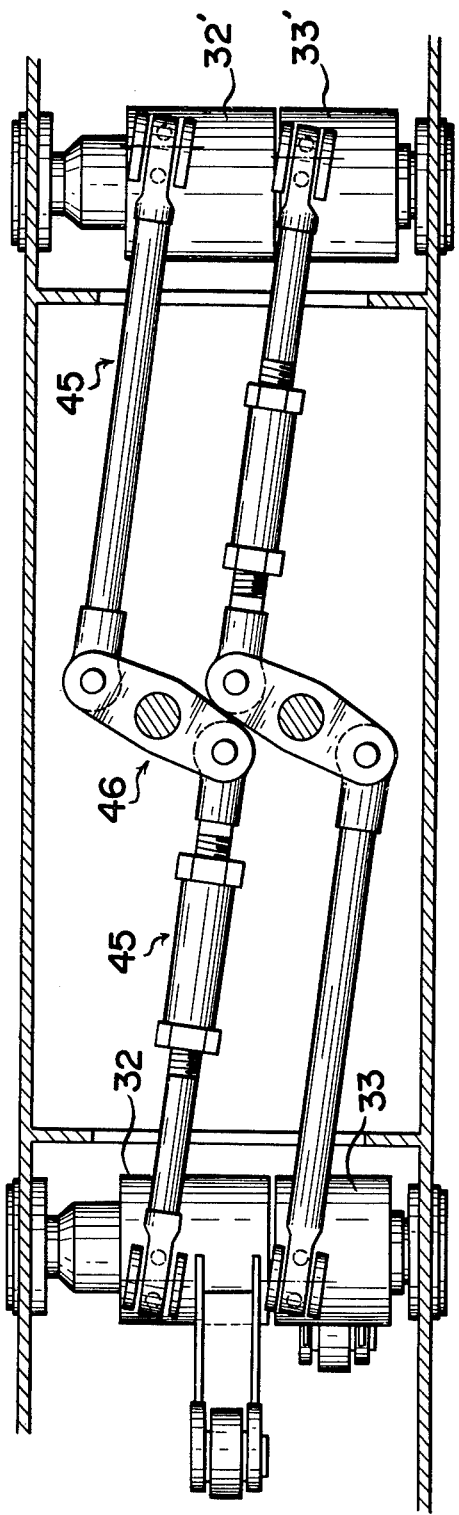

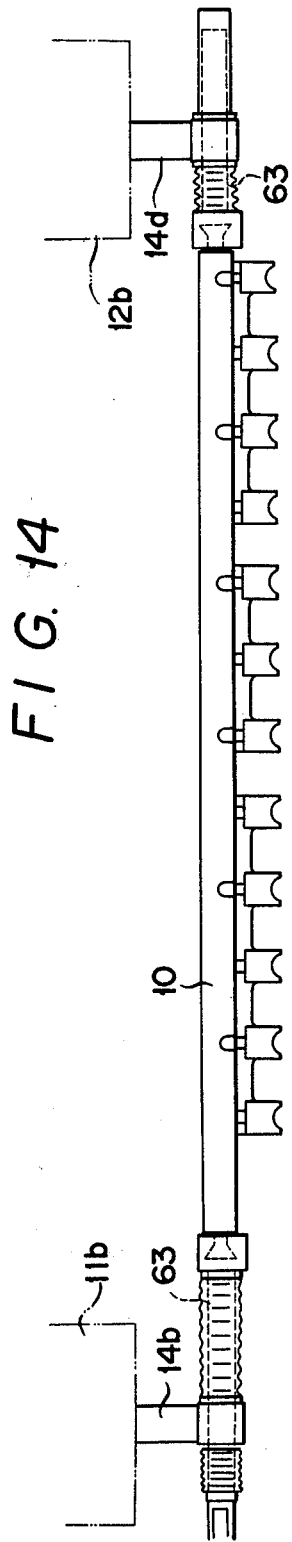

TRANSFER MECHANISM FOR FORGING MACHINES

BACKGROUND OF THE INVENTION

This invention relates to an automatic transfer mechanism for use in forging machines. The U.S. Pat. No. 3,422,657, disclosed an arrangement made such that transfer bars can be moved in three different directions, each direction being substantially perpendicular to the other two directions.

There is disclosed in the above-mentioned U.S. Patent a transfer for use in forging machines having a plurality of die stations comprising a beam assembly including a pair of substantially parallel beams extending past said die stations, each being adapted to support gripper means for gripping blanks to be transferred between said die stations, said beams being supported for operation through a cycle including movements in three different directions, each direction of movement being substantially perpendicular to the other two directions of movements, and three independent driving means operable in timed relationship so as to move said beams in the manner such that the movement produced by each driving means is not adversely affected by the operation of the other driving means, each being operable to move said beams in one of said directions.

In the device of the above-mentioned patent, however, there is not provided an enough space to accommodate loading and unloading means because of its construction per se.

SUMMARY OF THE INVENTION

It is, therefore, an object of the present invention to provide a transfer mechanism for use in forging machines having a pair of U-shaped casings accommodating driving means for the transfer mechanism so as to provide an enough space to accommodate loading and unloading means therein.

It is another object of the present invention to provide a transfer mechanism for use in forging machines wherein a pair of transfer bars can be intentionally lifted and/or unclamped by the actuation of the pneumatic cylinder means so as to make changing of die sets easier. It is still another object of the present invention to provide a transfer mechanism for use in forging machines wherein the height of the pair of transfer bars can be adjusted in response to the height of the die or the die set. It is a further object of the present invention to provide a transfer mechanism for use in forging machines wherein advancing and returning motions of the transfer bars can be automatically stopped when the loading imposed on the transfer bars exceeds a predetermined value, thereby preventing occurrence of an accidental damage to the transfer bars.

According to the present invention, there is provided a transfer mechanism for use in forging machines including a bolster comprising a pair of transfer bars mounted in substantially parallel relationship with each other, each being adapted to support gripper means for gripping blanks to be transferred, said transfer bars being supported for operation through a cycle including movements in three directions, each direction of movement being substantially perpendicular to the other two directions of movements, first, second and third driving means operable in timed relationship so as to move said transfer bars, each driving means being operable to move said transfer bars in one of said directions, said first and second driving means including four cylinders and a pair of cams, respectively, whilst said third driving means including a pair of cylinders and a pair of cams, two out of four cylinders of either of said first and second driving means and the pair of cylinders of said third driving means being adapted to urge cam followers against said cams during the cycle of operation so as to transmit driving force to move said transfer bars in one of said directions, and a pair of U-shaped casings mounted at both ends of said transfer bars so as to provide an enough to accommodate said transfer bars as well as loading and unloading means therein.

Other objects, features and advantages of the present invention will be readily apparent from the following description taken in conjunction with the accompanying drawings.

BRIEF DESCRIPTION OF THE DRAWINGS

FIG. 9 is a cross-sectional view of the driving means for lifting operation of the transfer bars;

FIG. 11 is a view taken along line XI—XI in FIG. 9;

FIG. 14 is a plan view of the transfer bar;

DETAILED DESCRIPTION OF THE PREFERRED EMBODIMENT

Figure 5:
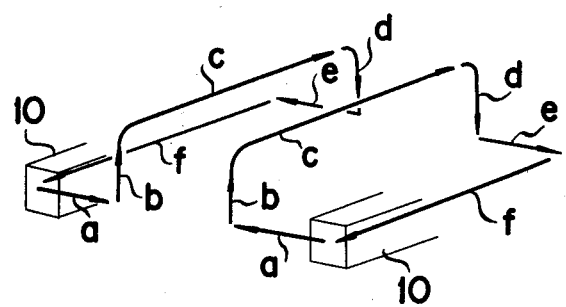
FIG. 5 is a locus of transfer bars in operation.

Reference numeral 1 denotes a forging machine, 2 a bed frame, 3 an upright 4 a tie rod, 5 a slide, 6 a bolster, and 7 a die set. Reference numerals 8, 9 denote transfer units mounted on the left and right side of the forging machine, respectively. Transfer bars 10, 10 are mounted between the transfer units 8 and 9 and across and over the bolster 6. The transfer bars 10, 10 are adapted to effect three-dimensional motions i.e., clamping motion "a", lifting motion "b" advancing motion, "c" descending motion "d", unclamping motion "e" and return motion "f", as shown in FIG. 5.

Reference numerals 11 and 12 represent boxes for accommodating the transfer units 8 and 9 mounted on the left and right sides, respectively. The boxes 11 and 12 are formed in U-shape with open central portion, respectively, when viewed from the side thereof and have a front portion divided into portions 11a and 12a and a rear portion divided into portions 11b and 12b, each having an open-top space 13 formed in the central part thereof as shown in detail in FIG. 4. Projecting symmetrically and horizontally into the spaces 13 are clamping rods 14a, 14b, 14c and 14d which support the above-mentioned transfer bars 10, 10.

Figure 6:
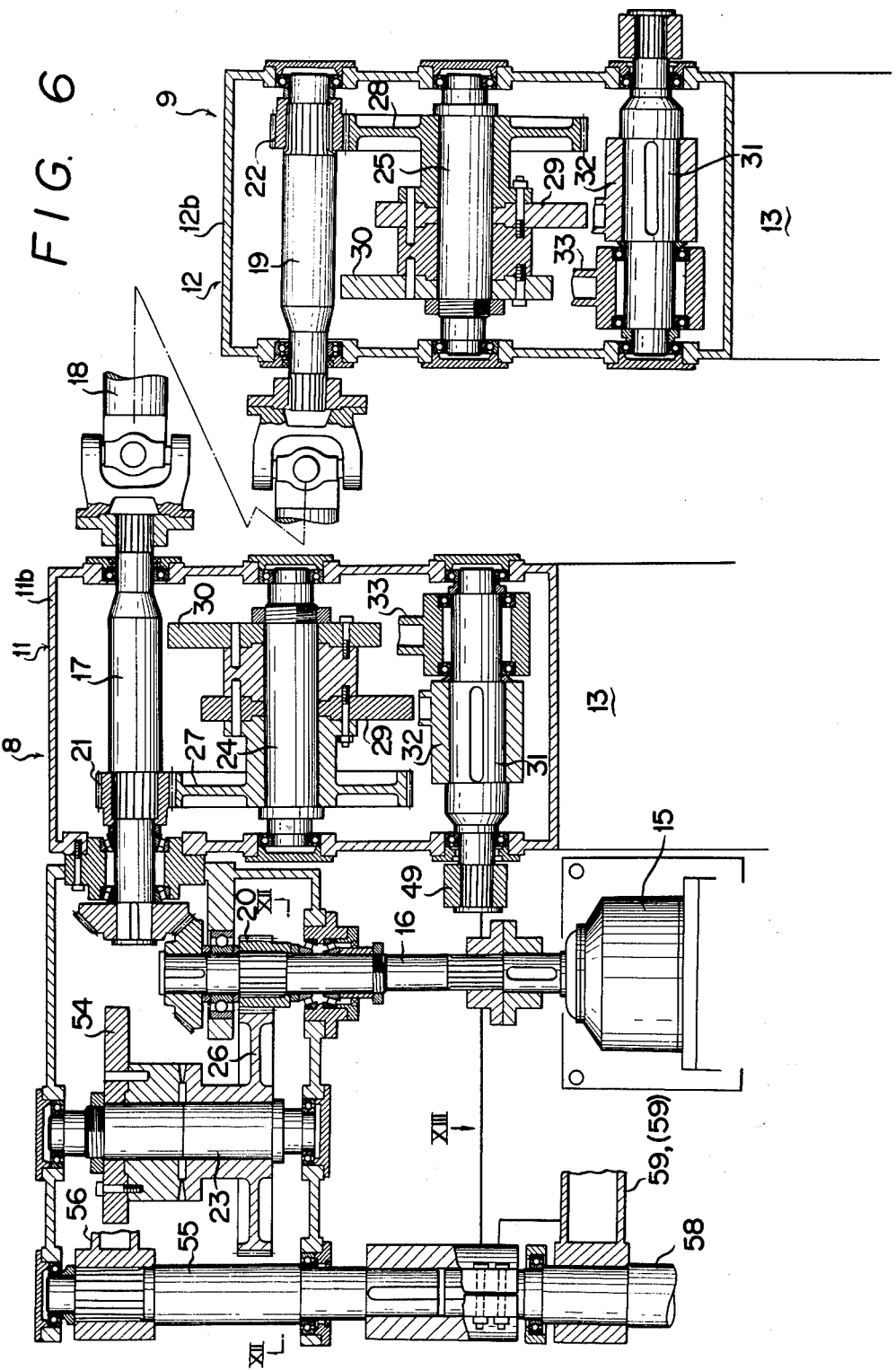
FIG. 6 is a cross-sectional view of the transmission gears of the present invention.
Figure 7:
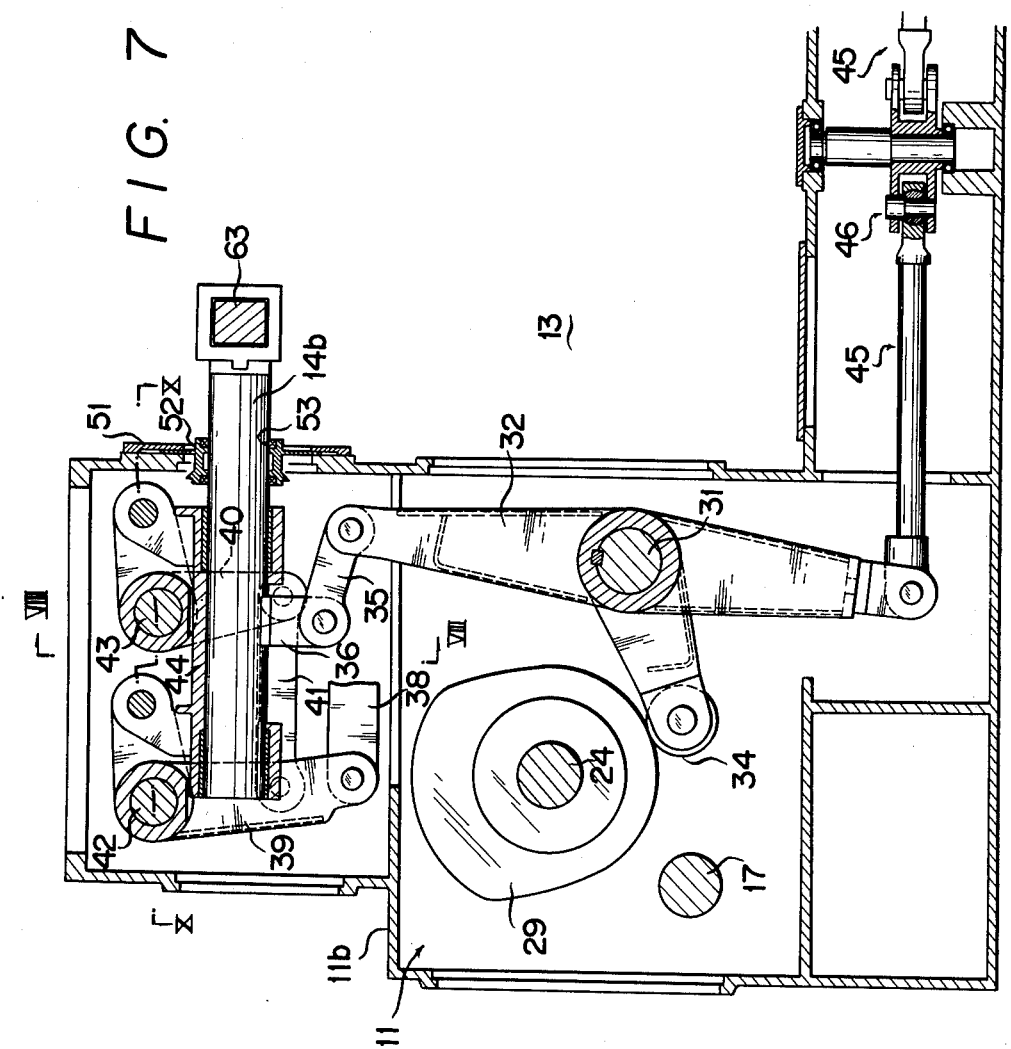
FIG. 7 is a cross-sectional view of the driving means for clamping operation of the transfer bars.
Figure 8:
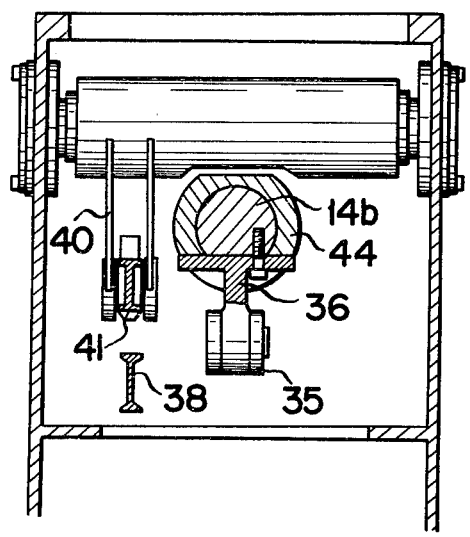
FIG. 8 is a cross-sectional view taken along line VIII—VIII in FIG. 7.

FIGS. 6 to 13 show the structure of the left and right hand transfer units 8 and 9. Reference numeral 15 denotes a nonstepping variable speed reduction gear which is mounted within the left hand transfer unit 8 and which is connected to an electric motor not shown. The reduction gear 15 is connected to a driving shaft 16 which is connected through a bevel gear mechanism to a power transmission shaft 17. The power transmission shaft 17 is connected through a propeller shaft 18 to a power transmission shaft 19 of the right hand transfer unit 9. The above-mentioned shafts 16, 17 and 19 have pinions 20, 21 and 22 fitted thereto, respectively. The pinions 20, 21 and 22 are arranged to mesh with gears 26, 27 and 28 which are fixedly secured to shafts 23, 24 and 25, respectively. Fitted to each of the shafts 24 and 25 are clamping cam 29 and lifting cam 30 so that the latter can be rotated together with the gears 27 and 28, respectively, as integral parts of them. Reference numeral 31 denotes lever shafts mounted in parallel with the above-mentioned shafts 24 and 25, each of which has a clamping lever 32 fixedly secured thereto by mean of an wedge, and also has a lifting lever 33 rotatably carried thereby. FIG. 7 shows a driving unit for clamping and lifting the left hand transfer unit 8. This driving unit has the same construction as that of the right hand transfer unit 9. In FIG. 7, the clamping operation lever 32 is fitted with a cam follower 34 arranged to abut against the above-mentioned clamping cam 29. Connected to one end of the clamping lever 32 is a link 35, the other end of which is connected to a bracket 36 fixedly secured to a clamping rod 14b.

On the other hand, as shown in FIG. 9, the lifting lever 33 has a cam follower attached thereto and which is adapted to abut against a lifting can 30. The lifting lever 33 has a link 38 connected to one end thereof. Reference numerals 39 and 40 denote L-shaped lever interconnected by means of a link 41. The above-mentioned link 38 is connected to one end of the L-shaped lever 39. The above-mentioned L-shaped levers 39 and 40 are fitted to shafts 42 and 43 carried within the box 11. The levers 39 and 40 are connected at the other ends thereof to a holder 44 which slidably suspended and carries the clamping rod 14b, as shown in FIG. 7.

The above-mentioned clamping lever 32 and lifting lever 33 are connected at the lower ends thereof through connecting rod means 45, 45 and linkage means 46 to unit clamping lever 32' and lifting lever 33' which are mounted within the front box 11a and which are adapted to move in response to movements of the above-mentioned rear operating levers 32 and 33.

Figure 4:
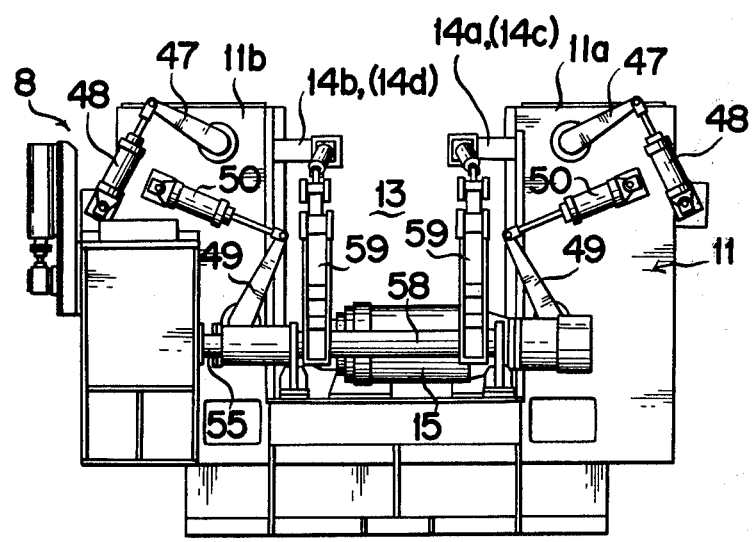
FIG. 4 is a side view of the transfer mechanism according to the present invention.
Figure 10:
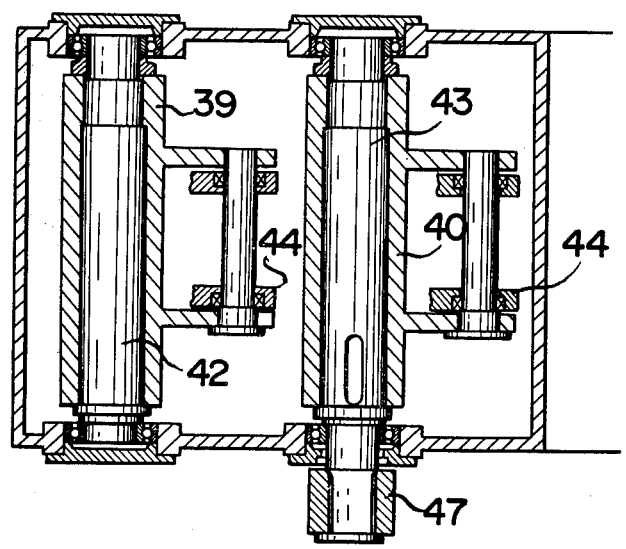
FIG. 10 is a cross-sectional view taken along line X—X in FIG. 7.

As can be seen from FIG. 10, shafts 43, which are one of shafts supporting the above-mentioned L-shaped levers 39 and 40, project from the boxes 11a and 11b, respectively, and each of which has a lever 47 fixedly secured thereto. As shown in FIG. 4, connected to the levers 47 are pneumatic cylinder means 48, 48 which are connected at one end thereof to the boxes 11a and 11b, respectively. Further, pneumatic cylinder means 50, 50 are connected in the similar manner through levers 49, 49 to one end of the lever shaft 31 carrying the clamping lever 32 and the lifting lever 33. Fixedly secured to the clamping rods 14a, 14b, 14c and 14d are screen plates 52 which are fitted in guide plates 51 secured to the end faces of the boxes and which are adapted to slide freely in the vertical direction. Reference numeral 53 denotes a packing. (Refer to FIG. 7).

Figure 12:
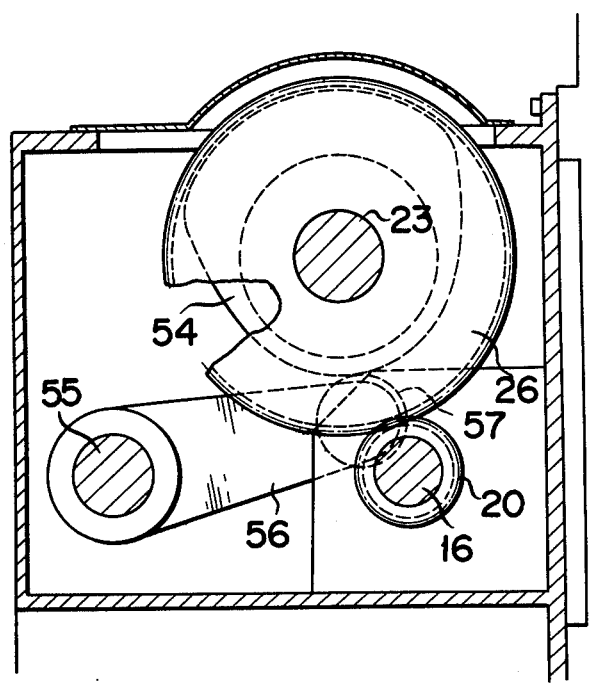
FIG. 12 is a view taken along line XII—XII in FIG. 6.

As can be seen from FIG. 6, the shaft 23 mounted in parallel with the driving shaft 16 has a feed cam 54 which is fixedly secured thereto so as to be rotated with the gear 26 as an integral part thereof. Mounted in parallel with the above-mentioned shaft 23 is a lever shaft 55 which has a feed operation lever 56 fixedly secured thereto as shown in FIG. 12. The feed operation lever 56 has a cam follower 57 mounted on the leading end thereof and which is adapted to abut against the feed cam 54. The lever shaft 55 is arranged to project as shown in FIG. 6, from the box 11b and is connected to a shaft 58 which is connected in turn to the lever shaft of the front transfer unit.

Figure 1:
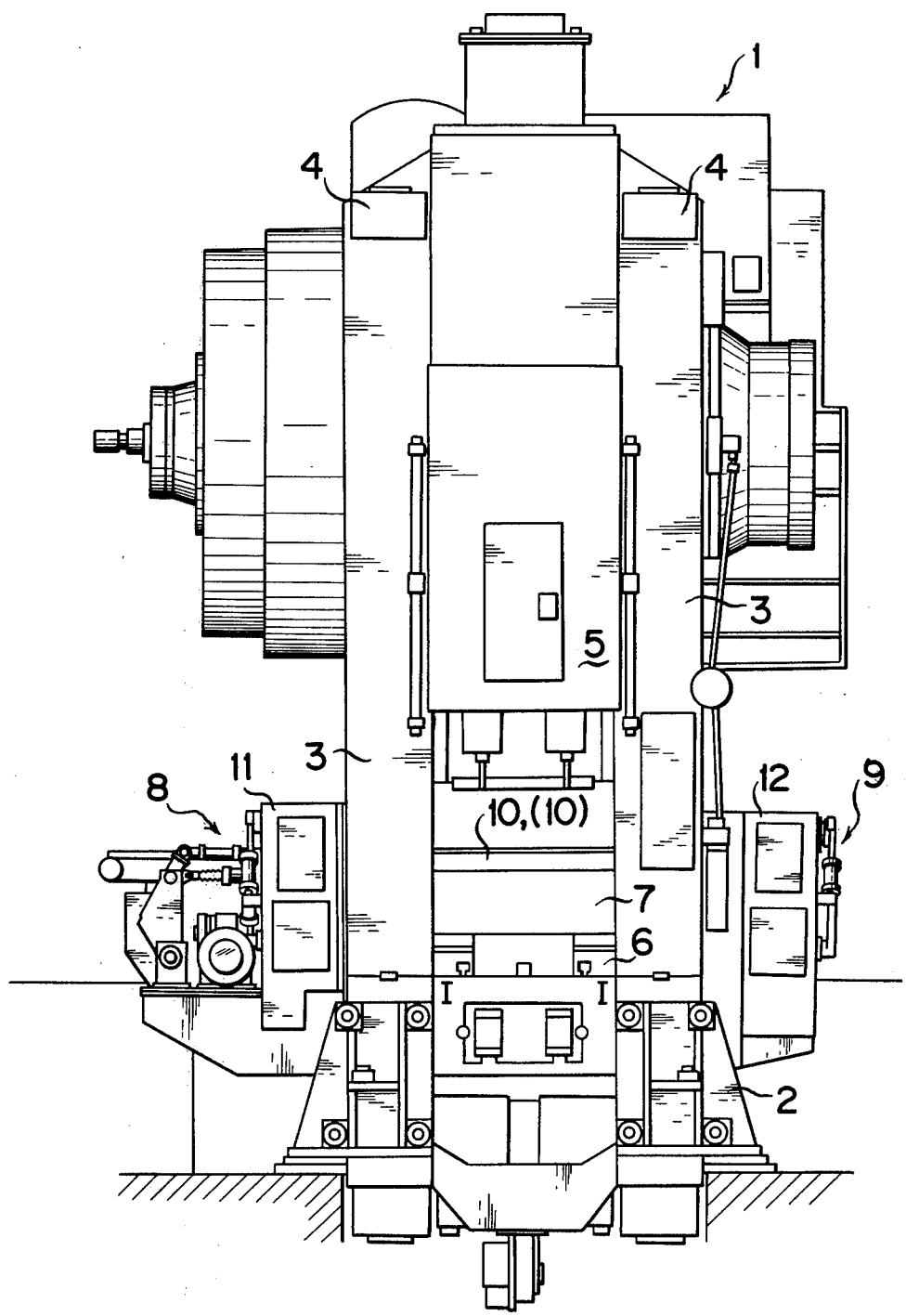
FIG. 1 is a front elevational view of a forging machine employing the transfer mechanism according to the present invention.
Figure 2:
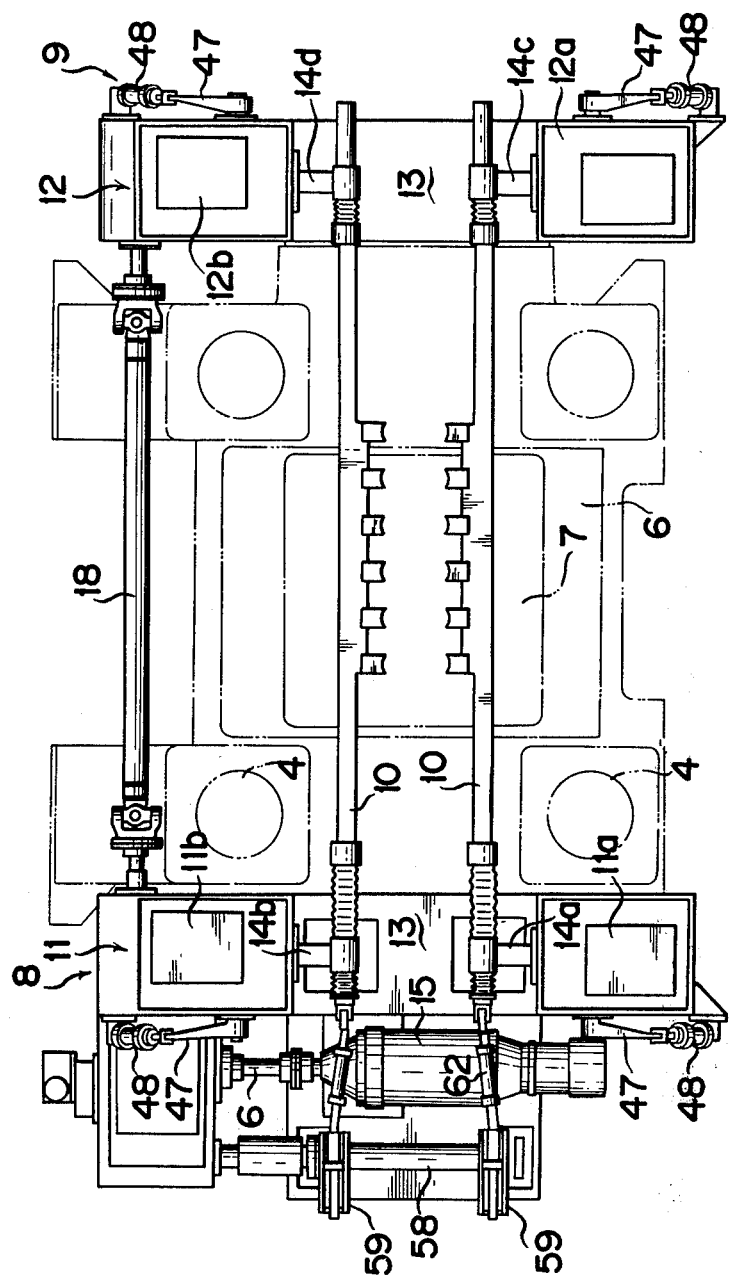
FIG. 2 is a plan view of the transfer mechanism according to the present invention.
Figure 3:
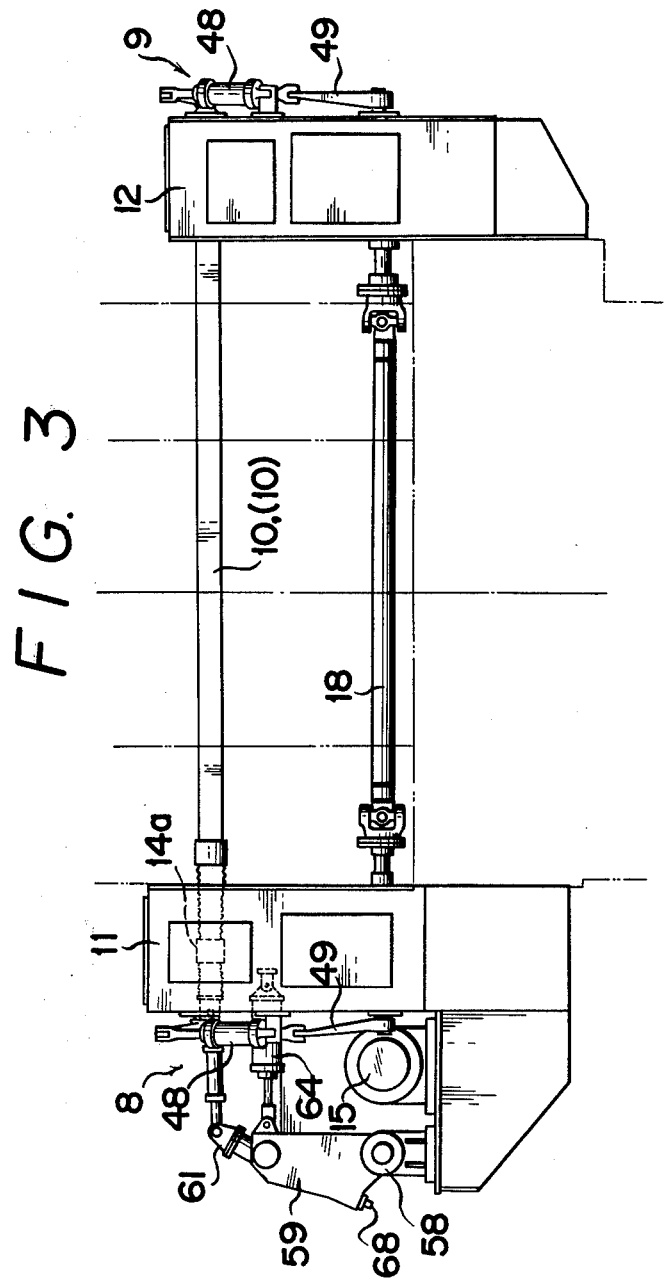
FIG. 3 is a front elevational view of the transfer mechanism according to the present invention.

As can be seen from FIGS. 2 and 3, feed levers 59, 59 are fixedly secured to the connecting shaft 58 at locations corresponding to the transfer bars 10, 10.

Figure 13:
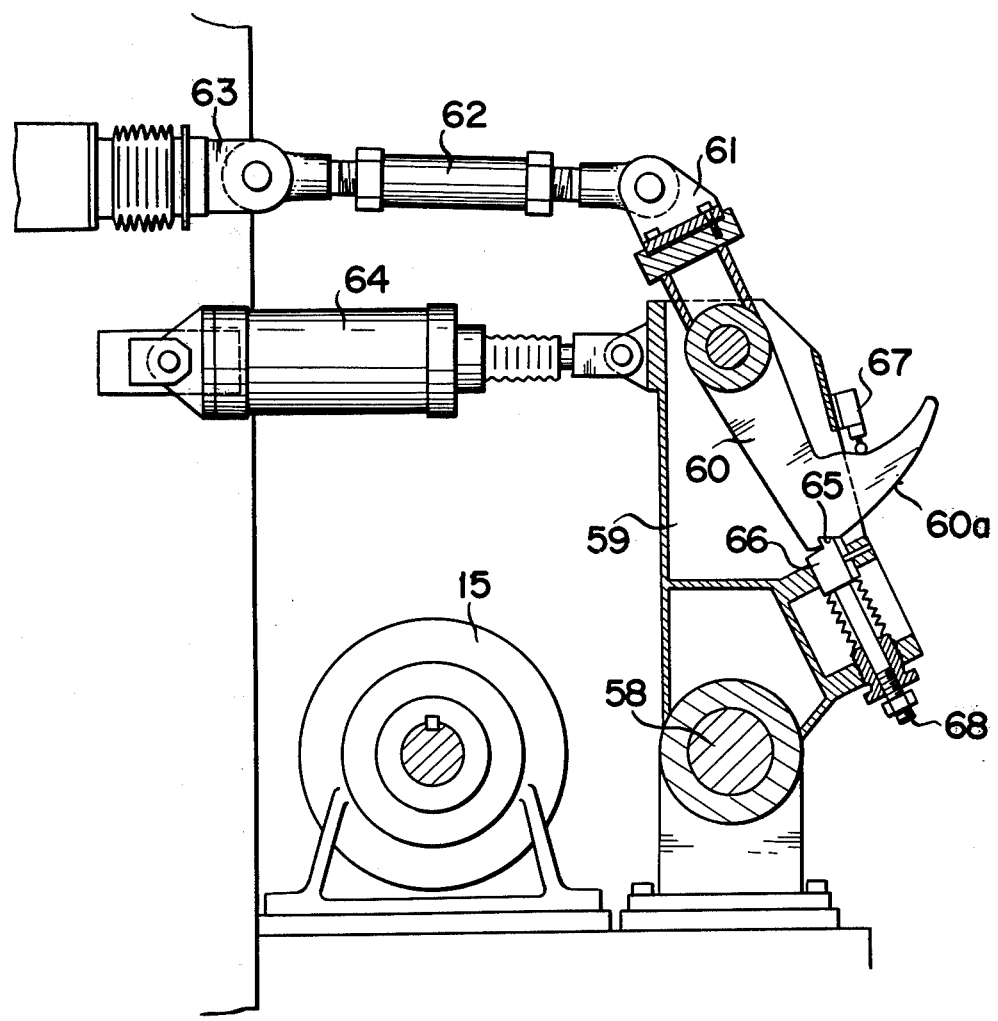
FIG. 13 is a view taken along an arrow XIII in FIG. 6.

As shown particularly in FIG. 13, a link 60 having a cam 60a formed as an integral part thereof is pivotally mounted in the feed lever 59. Fixedly secured to the link 60 is a bracket 61 which is connected through a turnbuckle mechanism 62 to a transfer bar rod 63 slidably supported by the clamping rods 14a, 14b, 14c and 14d. The above-mentioned feed lever 59 is connected to pneumatic cylinder means 64 which is connected at one end thereof to the box. The cam portion 60a of the link 60 has a notch 65 formed therein which is engaged with a projection 66 loaded by a spring. The arrangement is made such that, when an overloading ia exerted on the transfer bar 10 in the direction of feed, the above-mentioned projection 66 is disengaged from the notch 65 so that the cammed link 60 can be rendered inoperative or put under a free state. Such condition can be detected by means of a limit switch 67. Reference numeral 68 indicates a screw for adjusting the resilient force of the spring.

Figures 15, 16:
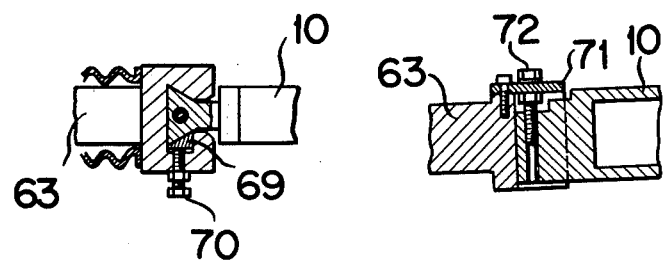
FIG. 15 is a plan view partially in cross-section of the connecting portion of the transfer bar and the transfer bar rod.
FIG. 16 is a side view of FIG. 15.

The transfer bar 10 is connected to the transfer bar rod 63 in the manner as shown in FIGS. 14, 15 and 16. In brief, the transfer bar 10 is engaged with the transfer bar rod 63 so that the former can be slidably moved relative to the latter. The transfer bar 10 can be fixedly secured to the transfer bar rod 63 by pushing a wedge 69 by means of a bolt 70. Further, a bolt 72, which is rotatably carried by a plate 71 fixedly secured to the transfer bar rod 63, is screw-threaded with the screw formed in the transfer bar 10. Turning the bolt 72 enables the transfer bar 10 to be moved up and down relative to the transfer bar rod 63.

Further, the pneumatic cylinder means 48, 50 and 64 connected to the above-mentioned shafts can be rendered operative by manipulating respective solenoid valves, respectively.

In the arrangement mentioned hereinabove, when the driving shaft 16 is rotated by way of the reduction gear 16, then the gears 26, 27 and 28 will rotate. The rotation of the gears 26 and 27 permits rotation of the clamping came 29 and the lifting cams 30 of the left and right hand transfer units 8 and 9 so that the operating levers 32 and 33 abutting against the cams 29 and 30 can be rotated. As a result, the clamping rods 14a, 14b, 14c and 14d can be rendered operative longitudinally and in symmetrical relationship so as to effect repeatedly clamping motion "a", lifting motion "b", descending motion "d" and unclamping motion "e" as previously mentioned.

The rotation of the gear 26 permits rotation of the feed cam 54 so that the lever 56 can be turned by the cam follower 57 engaging with the cam 54. In consequence, the clamping rods 14a, 14b, 14c and 14d are permitted to move to the left and right thereby enabling the transfer bars 10, 10 to effect the advancing motion "c" between the lifting motion "b" and the descending motion "d", and the returning motion "f" between the unclamping motion "e" and the clamping motion "a".

The cam followers 39 and 37 abutting against the clamping cam 29 and the lifting cam 30 are loaded, by the pneumatic cylinder means 48 and 50 connected to the lever shafts 31 and 43 in the direction of engagement. However, actuation of the pneumatic cylinder means 48 and 50 by manipulating respective solenoid valves in the opposite direction enables the cams 29 and 30 to be disengaged forcibly from the cam followers 34 and 37, respectively. Stating in brief, actuation of the pneumatic cylinder means 48 enables the L-shaped levers 39 and 40 to be rotated so that the holder 44 can be moved upwards thereby forcibly lifting the clamping rods 14a, 14b, 14c and 14d. Further, rendering another pneumatic cylinder means 50 operative permits rotation of the shaft 31 so that the clamping lever 32 can be turned in such a direction as to move the cam follower 34 away from the cam 29 thereby permitting unclamping operations of the clamping rods 14a, 14b, 14c and 14d.

In the operation mentioned hereinabove, the transfer bars 10, 10 can travel across the bolster 6 so as to convey in turn articles moulded by die sets by their three-dimensional motions. However, in the case the height, of the die set 7 is changed, adjustment should be made by loosening the wedge 69 and moving up or down the transfer bars 10, 10 relative to the transfer bar rod 63 by means of the bolt 72.

Further, turning of the lever 56 enables rotation of the feed lever 59 fixedly secured to the connecting shaft 58 which is coupled with the lever 56. At that time, the cammed link 60, which is pivotally mounted on the feed lever 59 and which is connected at one end thereof to the transfer bar 10, has the notch 65 of the cam 60a engaged by the spring loaded projection 66, so that the link 60 can oscillate together with the feed lever 59 as an integral part thereof, thereby permitting feeding operations of the transfer bars 10, 10.

In the course of the above-mentioned operation, when an overload is exerted on the transfer bar 10, 10 in the direction of feed, the projection 66 is disengaged from the notch 65 so that the cammed link 60 can be rendered free relative to the feed lever 59 thereby stopping the feed operation thereof. Such condition can be detected at the same time by means of the limit switch 67 as previously mentioned.

It is to be understood that the foregoing description is merely illustrative of the preferred embodiment of the present invention and that the scope of the present invention is not to be limited thereto, but is to be determined by the scope of the appended claims.

I claim:

1. A transfer mechanism for use in forging machines, including a bolster comprising a pair of transfer bars mounted in substantially parallel relationship with each other, each being adapted to support gripper means for gripping blanks to be transferred, said transfer bars being supported for operation through a cycle including movement in three dimensions, each dimension being substantially perpendicular to the other two dimensions of movement, first, second and third driving means operable in timed relationship so as to move said transfer bars, each driving means being operable to move said transfer bars in one of said dimensions, said first and second driving means including four cylinders and a pair of cams, respectively, whilst said third driving means including a pair of cylinders and a pair of cams, at least two out of four cylinders of either of said first and second driving means and the pair of cylinders of said third driving means being adapted to urge cam followers against said cams during the cycle of operation so as to transmit driving force for moving said transfer bars in one of said dimensions, and a pair of U-shaped casings, one mounted at each of the ends of said transfer bars so as to provide enough space to accommodate said transfer bars as well as loading and unloading means therein.

2. A transfer mechanism for use in forging machines of claim 1 wherein during each cycle said transfer bars first move laterally towards each other, then move normal to the bolster in a direction away therefrom, then move transversaly with respect to the bolster in a forward direction, then move normal to and toward the bolster, then move laterally apart, and then move transversely in such a direction as to return to their initial positions.

3. A transfer mechanism for use in forging machines of claim 1 wherein said pair of transfer bars are supported by transfer bar rods at both ends thereof in such a manner that the height of said transfer bars can be adjusted at the supporting portions.

4. A transfer mechanism for use in forging machines of claim 1 wherein said third driving means further comprises a driven shaft having the cam follower mounted thereon, a feed lever fixedly secured to said driven shaft at one end thereof, the other end of said feed lever being connected to a piston rod of said cylinder, a link having a cam formed at one end thereof, said link being adapted to be accommodated within said feed lever, the other end of said feed lever being connected to said transfer bar, the cam portion of said link having a notch formed thereon, and a projection formed on said feed lever, wherein during normal operation cycle said projection can be engaged with the notch formed on the cam so as to transmit driving force for moving said transfer bars longitudinally, and when the loading exerted on said transfer bars exceeds a predetermined valve, the projection can be disengaged from the notch of said cam thereby preventing overloading from being imposed on said transfer bars.

* * * * *